Dec. 10, 1940.  E. C. LOESSER  2,224,190
BOILER CONTROL APPARATUS
Filed Nov. 6, 1937  3 Sheets-Sheet 1
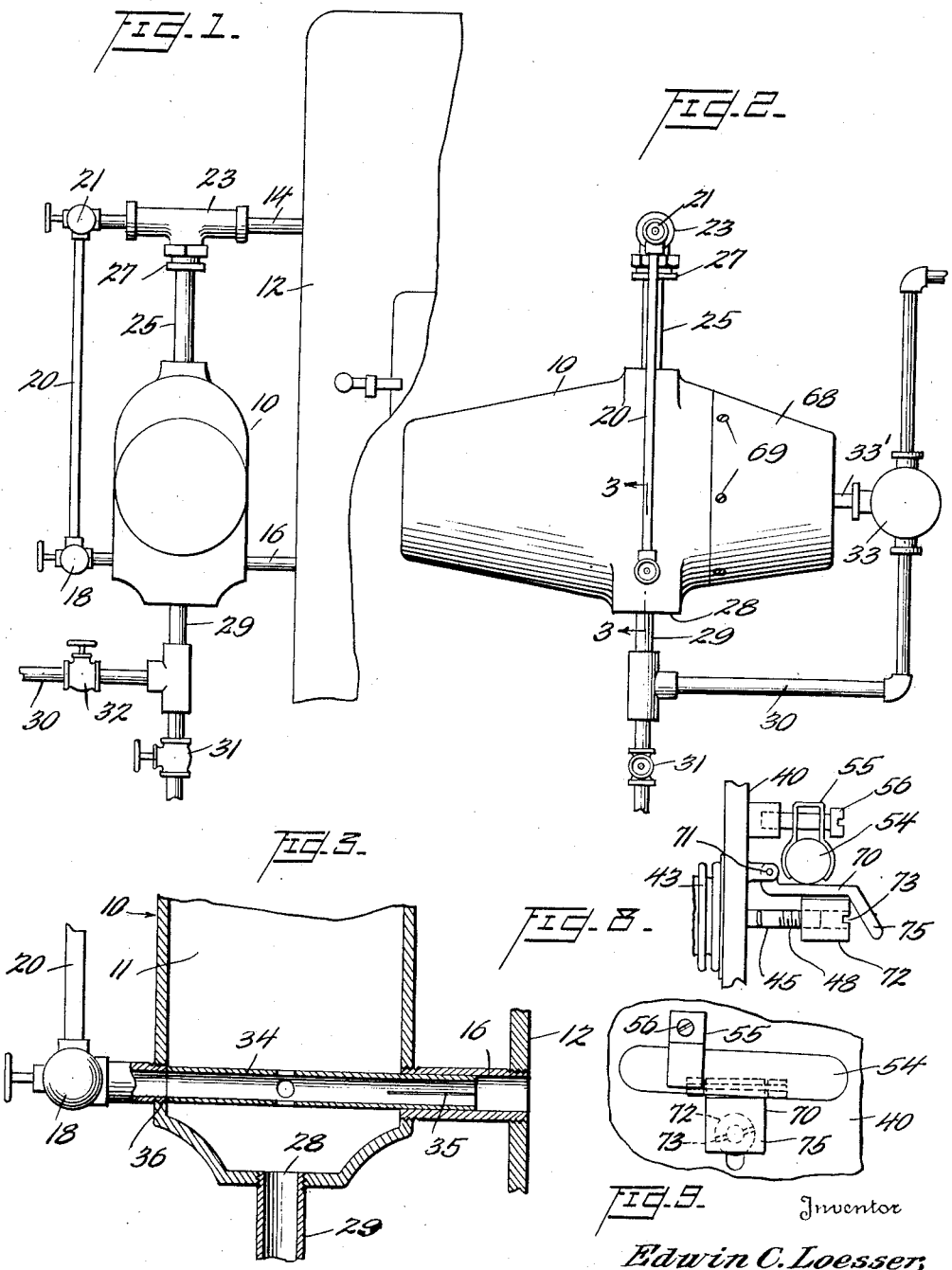

Dec. 10, 1940.   E. C. LOESSER   2,224,190
BOILER CONTROL APPARATUS
Filed Nov. 6, 1937   3 Sheets-Sheet 2
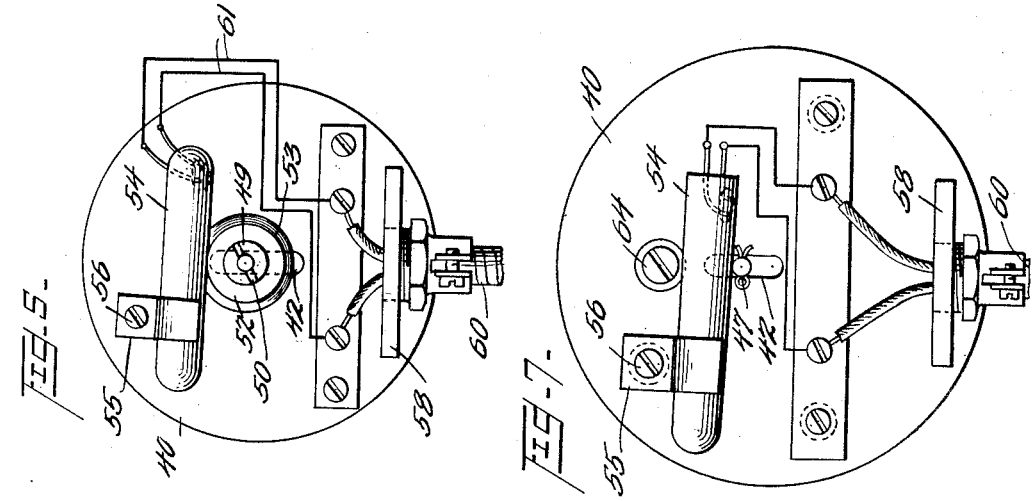
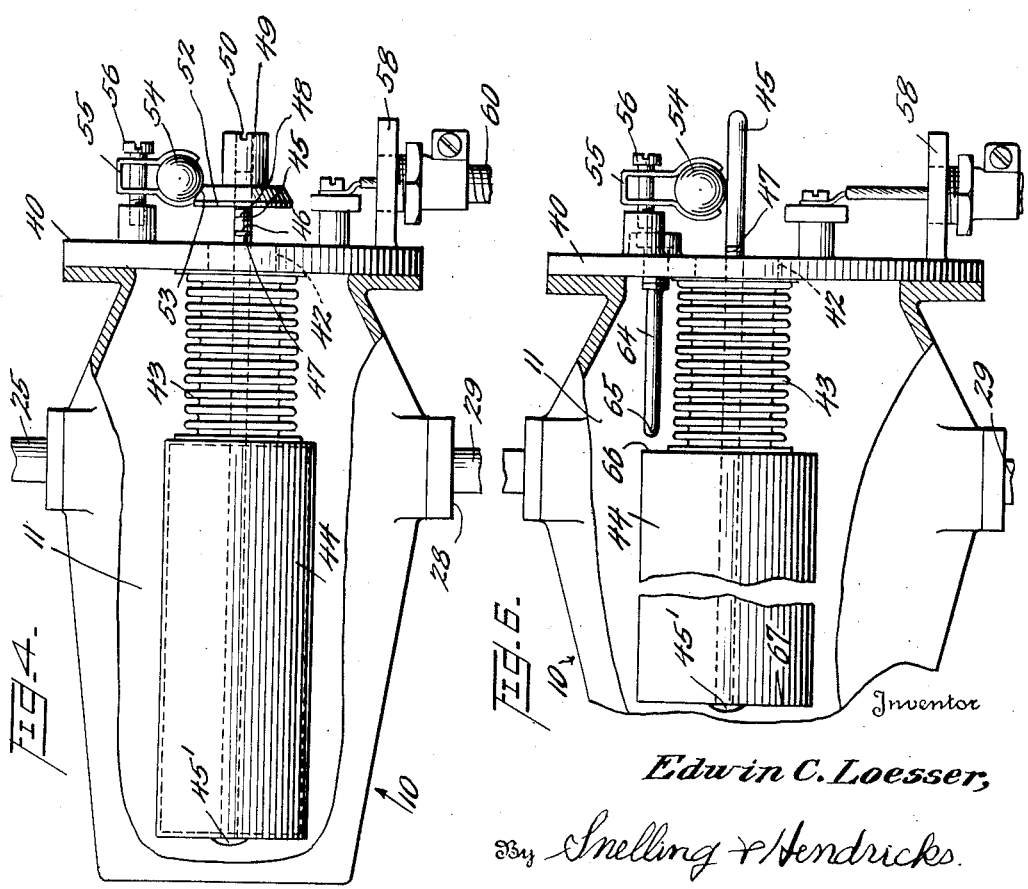
Inventor
Edwin C. Loesser,
By Snelling & Hendricks.
Attorneys.

Dec. 10, 1940.  E. C. LOESSER  2,224,190
BOILER CONTROL APPARATUS
Filed Nov. 6, 1937  3 Sheets-Sheet 3
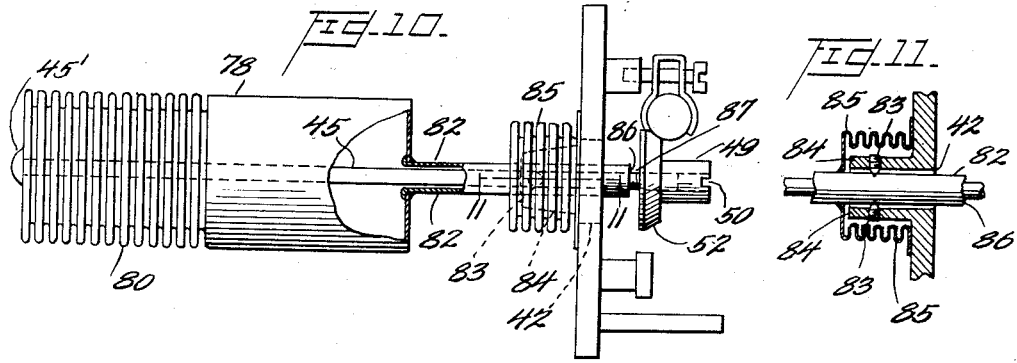
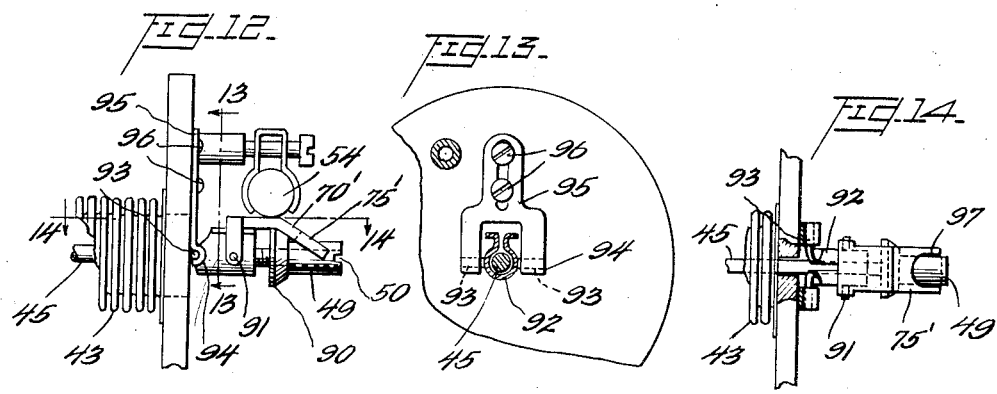
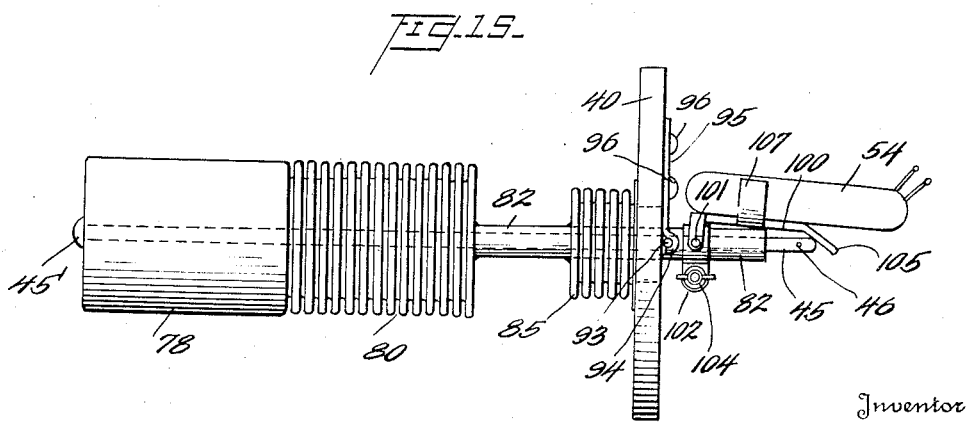
Inventor
Edwin C. Loesser,
By Snelling & Hendricks
Attorneys.

Patented Dec. 10, 1940

2,224,190

UNITED STATES PATENT OFFICE 2,224,190

BOILER CONTROL APPARATUS

Edwin C. Loesser, Glen Ridge, N. J.

Application November 6, 1937, Serial No. 173,260

20 Claims. (Cl. 200—83)

This invention relates to control apparatus for steam and hot water boilers used in closed systems operating under pressure and for so-called vapor systems which operate under a certain amount of vacuum. The general object of the invention is to simplify such control apparatus and in particular to improve the apparatus disclosed in Patent No. 1,985,659, dated December 12, 1930, which was reissued May 24, 1937, as Reissue Patent Number 20,380.

A particular object of the invention is to provide a more positive and more easily adjustable as well as a more sensitive pressure responsive switch control means.

A specific object of the invention is to provide in the control a simple means for preventing the expansion of the pressure responsive element beyond a safe limit, particularly when used on vacuum systems.

A further object of the invention is to provide a compressible float.

Another object is to provide a control apparatus which may be quickly installed on the gauge glass mounting of a boiler and which control apparatus provides means for remounting the gauge glass near its original position.

A still further object is to provide a control connection which necessarily causes the flushing of the control unit whenever water is added to the system thus ensuring a clean control and thereby not only reducing the hazard of control failure but prolonging the dependable life of the control.

An important object of the invention is to provide means for retarding or damping surges that might otherwise be transmitted from the boiler to the control device.

Due to the great simplicity of this control apparatus my mode of carrying out these objects of the invention can be quickly understood by a glance at the attached drawings.

Figure 1 is a side view of my control apparatus as installed on a boiler, showing a hand control water supply connection.

Figure 2 is a front view of the apparatus shown in Figure 1 but having an automatic water supply valve.

Figure 3 is a fragmentary section of the apparatus taken along line 3—3 of Figure 2.

Figure 4 is a side view of the control partly broken away to show the float and pressure unit.

Figure 5 is an end view of the control unit illustrated in Figure 4 but showing the switch mechanism.

Figure 6 is a view similar to Figure 4 showing a part of the float chamber of my improved control apparatus equipped with a modified form of the switch actuating mechanism.

Figure 7 is a switch end view of the float chamber in Figure 6.

Figures 8 and 9 are fragmentary views similar to Figures 4 and 5 but showing a modified form of switching apparatus.

Figure 10 is a side view of a modified form of the float and switch actuating mechanism removed from the float chamber.

Figure 11 is a section taken on line 11—11 of Figure 10.

Figure 12 is a side view of a modified form of the switch actuating mechanism.

Figure 13 is a view taken on line 13—13 of Figure 12.

Figure 14 is a plan view taken on line 14—14 of Figure 12.

Figure 15 is a side view of a modification of the device shown in Figure 10.

In Figure 1 the control 10, which consists principally of the float chamber 11, is shown connected to a boiler 12 by means of the usual glass gauge nipples 14 and 16, the lower nipple being screwed into the side of the float chamber opposite a third connection 18, which third connection constitutes the lower support for the gauge glass 20, the upper end of which is carried in a similar fitting 21. Between the upper nipple 14 and the fitting 21 is a T-connection 23, the central opening of which is connected to a vertical nipple 25 projecting upward from the top of the float chamber. The connection between the nipple 25 and the T connection is preferably a slip joint as well known construction which permits easy and quick connection as it merely requires manipulation of the nut or packing gland 27.

As best shown in Figure 2 the floor of the float chamber 11 is sloped toward the drain opening 28 near the front in which opening is screwed the connection 29 which may provide not only communication with a water supply for the boiler as by the valved pipe line 30 but also communication with the drain cock 31.

The pipe line 30 leading from the water supply main (not shown) may be provided with a hand valve 32 as shown in Figure 1 or with an automatic valve 33 as shown diagrammatically in Figure 2. The automatic valve 33 may be of any well known make now obtainable on the market and although shown positioned to be operated directly by the float through the connection 33' it is to be understood that within the scope of the present invention the automatic valve 33 may be electrical and therefore may be placed at any convenient location in the supply line in which case the connection 33' would of course be electrical.

Before describing the control apparatus in detail I will now set forth the operation of the quick hook-up feature of my control. The first step is the removal of the glass gauge, if one is provided on the boiler, if not, then the plugs found in the gauge glass openings are removed from the side of the boiler and in their place there are screwed the two nipples, 14 and 16. Then a retarder tube 34 is telescoped into the lower nipple 16 in which it has a snug fit due to the provision of one or two slots 35 which permit the tube to accommodate itself to the interior surface of the nipple. See Figure 3. The purpose of the retarder tube is to damp or prevent the transmission of surges from the boiler to the control apparatus. The length of the exposed part of the retarder tube should be slightly greater than the distance between the side openings of the float chamber 11 so that when the float chamber is screwed on the lower nipple 16 the end of the tube projects a slight distance into the opposite opening 36 into which the gauge glass fitting 18 is now screwed.

The insertion of the fitting 18 brings the end of the fitting against the open end of the retarder tube which it closes from the control chamber but at the same time provides direct communication between the glass gauge 20 and the boiler. In screwing the fitting 18 into place the retarder tube, of course, is engaged by the end of the fitting and forced farther into the nipple 16; the meeting ends need not be exactly "square" as a crack at this point is of no consequence. I now screw the T connection 23 to the nipple 14 and then provide a nipple 25 which has threads at the lower end for screwing into the top of the float chamber 11 but has no threads at the upper end, which unthreaded end is slipped into the central opening of the T connection, the nut or packing gland 27 having first been put on the nipple 25. The T connection is now turned until the nipple 25 can be screwed into the top of the float chamber after which the packing gland 27 is tightened. The gauge glass 20 is now installed in the usual manner. Finally, I connect the bottom opening 28 of the float chamber to a water supply line and to a drain cock 31 as shown in Figures 1 and 2. The reason for connecting the boiler 12 to a water supply in this manner is that it insures the flushing of the control chamber whenever water is added to the system which occurs five or six or more times per season.

Referring particularly to Figures 4 and 6, the float chamber 11 is provided with a removable head or closure 40 having a central opening 42. To the inside of this head is secured in a watertight manner the bellows 43, which bellows covers the opening 42 and which provides a resilient connection between the head and the float 44 which is preferably, but not necessarily, cylindrical and which is also preferably greater in diameter than the bellows 43. Rigidly secured to the float is the switch actuating rod 45 which rod "floats" exactly as does the corresponding rod shown in said patent but in the present invention it is straight and not provided with a curved portion. Another difference is that the rod used in the present invention is transversely bored at 46, for carrying a pin of some kind for example a cotter pin 47 when the control unit is used on a vacuum system and is for preventing the expansion of the bellows 43 beyond a safe limit. As shown in Figure 7 the cotter pin 47 is horizontal and extends across the opening 42 so that during the time it acts as a stop it also may act as a fulcrum about which the float may turn in response to change of water level. During normal operation the pin 47 is spaced from the head 40 as shown in Figures 4 and 6 and engages the head only when the vacuum reaches a value beyond the normal operating vacuum of the system. The switch actuating rod preferably extends the full length of the float and is secured to the free end at 45' which gives the device greater rigidity.

In the preferred embodiment of that part of my invention shown in Figures 4 and 5 the switch actuating rod 45 is threaded at the free end 48 and over this threaded end is screwed an internally threaded sleeve 49 having at the outer end a kerf 50 to permit the use of a screw driver in making axial adjustment of the sleeve with respect to the rod. The sleeve carries a vertical disk 52 having a beveled edge 53 for engaging and supporting the end of the mercury switch tube 54 carried in a clip 55 which is freely pivoted on the head 40 as by means of a screw 56. Thus in effect means are provided for varying the length of the rod so that the mechanism may be adjusted to operate the switch for any given pressure within the range of the device. It is understood that the beveled edge 53 acts as a camming surface which surface engages and tilts the tube 54 causing the switch to operate in response to axial thrust of the rod due to increase in boiler pressure. In Figure 5 I show the switch arranged so that the circuit is opened when the tube is tilted in a counter clockwise direction about the pivot pin 56, which motion occurs either when the water level drops to an undesirable point or when the boiler pressure rises above a predetermined point. Obviously the tube can be reversed in position to make the circuit close under the same conditions. The shelf 58 is provided on the head 40 for supporting a cable 60 carrying the electric conductors 61 which connect the switch with the desired mechanism such for example as automatic heat supply controls, water supply valves and similar mechanism now commonly controlled by such switches.

In the embodiment of my invention shown in Figure 6 I provide a pressure stop which comprises a screw 64 held in the head 40 in such a position that the free end 65 is engaged by the face 66 of the float as the pressure within the chamber moves the float toward the head. Upon a further increase of pressure the free end 67 of the float begins to sink into the water due to the fact that the float turns about the end 65 of the pressure stop as a pivot, which turning causes the free end of the actuating rod 45 to rise and operate the switch 54.

As will be seen in Figure 7 the switch is substantially the same as that in the preferred modification shown in Figure 5, the primary difference being the omission of the disk 52 and the adjustable sleeve 49 which parts are rendered unnecessary by the stop screw 64 which is axially adjustable to provide for setting the control to operate on any desired pressure.

In the modification shown in Figure 6 the float is made to pivot about a fixed point under an increase in pressure and this point is placed a considerable distance from the operating end of the switch rod 45 so that a slight increase in pressure will produce a relatively great movement of the end of the switch rod, thus producing a more sensitive device than was possible in the old apparatus which used the thrust of the switch rod instead of the tilting movement of the rod. Other advantages of the use of the pressure stop will be obvious.

The switch apparatus is protected by a cover 68 which may be held in place by the screws 69 shown in Figure 2.

In some installations it may be that the disk 52 is undesirable in which case, as shown in Figures 8 and 9, I provide in its stead a plate 70 freely pivoted at one end 71 on the head or wall 40 and held in a substantially horizontal position by the free end of the floating rod 45. The rod 45 is preferably threaded at 48 as in Figure 4 for receiving the internally threaded sleeve or cap 72 which is kerfed at the end 73 so as to be easily turned by means of a screw driver when it is desired to change the pressure setting of the control. The plate 70 has its free end 75 bent downward at about 45° to form a camming surface against which the rounded end of the cap 72 is thrust by axial movement of the rod 45 when the pressure increases above a predetermined amount. This action causes the plate to tilt upward about its pivot which tilts the switch tube 54 to open or close a circuit as desired.

When packing the control for mailing or for shipping it is sometimes necessary to provide means for preventing the float from swinging and injuring the bellows during transit. In order to avoid this extra expense and bother I have devised a more sturdy control as shown in Figures 10 and 11 in which the bellows does not support the float. In this modification the float 78 is compressible due to one end being corrugated as at 80 which corrugated end is supported at all times by the rod 45 secured at the free end 45' to the end of the float and passing axially through the float and float supporting tube 82 pivoted on screws or trunnions 83 carried in the arms 84 positioned on each side of the aperture 42 and projecting inwardly from the wall, the aperture 42 being sealed by the bellows 85. During shipment the sleeve 49 is preferably positioned with the disk 52 against the end 86 of the tube 82 but in installing the control for operation the sleeve is backed off until there is an appreciable space 87 between the disk and the tube end. It will be seen that the disk may act as a stop to prevent over-expansion of the bellows 80 when the control is used in vapor systems so that the cotter pin 47 shown in Figures 4, 5 and 7 is unnecessary.

The modification of my invention illustrated in Figures 12, 13 and 14 is similar to that shown in Figure 8 in that the switch actuating rod 45' is provided with an axially adjustable sleeve 49. The float plate 70' however is not mounted on a fixed axis but is pivoted on the trunnions 91 carried on the pivoting sleeve 92 which sleeve in turn is mounted on a vertically adjustable axis provided by a second pair of trunnions 93 carried in the journals 94 at the lower end of the vertically adjustable support member 95 secured on the head 40 by the screws 96. The rod 45 is free to slide in the sleeve 92 to actuate the switch 54 upon increase of boiler pressure in the same manner as in the preferred modifications. The cap end 90 may cooperate with the pivoting sleeve 92 to act as a stop to limit the expansion of the bellows 43 upon increase of vacuum above a safe value. The downwardly projecting end 75' of the float plate 70' is cut away at 97 to permit access to the end of the sleeve 49.

As illustrated in Figure 15 the mercury tube 54 may be tiltably mounted on the float supporting tube 82 shown in Figure 10 and the tube may be pivoted on a vertically adjustable axle 93 in much the same way as shown in Figure 12. The float plate 100 is pivoted on the tube 82 on trunnions 101 carried on a clamp 102 which may be shifted axially as desired by loosening the wingnut 104. This shifting changes the setting of the control by changing the axial relation of the end of the rod 45 with the down turned camming portion 105 of the float plate 100. The plate may be provided with curved arms 107 for resiliently clamping the switch tube 54 in position and I also prefer to provide a transverse bore 46 in the rod 45 as in Figure 6 so that when the control is used on vapor systems a cotter pin may be added to guard against over-expansion of the bellows. Upon a change in water level the tube 54 is of course tilted and the circuit is opened or closed, depending on the arrangement of the tube. In this figure the float is compressible as in Figure 10 but the corrugations 80 are on the opposite end.

What I claim is:

1. In a boiler control switching apparatus, a float chamber having a top opening, a side opening and a bottom opening at its lowest point, a float in said chamber adapted to operate on a water level between the top opening and the side opening, means for connecting the top and side openings to a boiler, a feed water pipe connected to said bottom opening, and a valve controlling the feed of water to the chamber and located in said pipe at an elevation higher than that of said bottom opening whereby the float chamber is flushed each time water is supplied to the boiler.

2. In a boiler control switching apparatus for connection with a boiler having a chosen water-level, a float chamber adapted to be connected to a boiler above and below the water level thereof whereby the water level of the boiler may be reflected in the chamber, switch control apparatus in said chamber, the walls and floor of said chamber being sloped to drain toward an inlet opening in the floor whereby any sediment in the water tends to move to the inlet opening, a water supply connected to said inlet opening of the chamber whereby any water added to the boiler passes through said chamber thereby flushing the connections and chamber free of sediment that might impair the operation of the switch control apparatus.

3. In a boiler control switching apparatus, a float chamber, a float therein, a valved drain pipe leading from the lowest point in said chamber, a water supply pipe connected to said drain pipe above the drain valve, and a valve controlled by the float to admit water to the chamber through said drain pipe.

4. In a boiler control switching apparatus a float chamber, a float in the chamber, a steam connection for said chamber, a water connection near the bottom of the chamber, switching apparatus connected to be operated by movement of the float, a surge retarding means comprising a tube communicating with said water connection at one end and communicating with the chamber by means of a restricted lateral hole in the wall of said tube whereby the switching apparatus is prevented from opening and closing in response to surges in the boiler.

5. In a boiler control switching apparatus of the type described comprising a float chamber, pressure and liquid level responsive switch operating elements in said chamber, said chamber having means above a predetermined liquid level for communicating with a boiler, substantially coaxial pipe connections on opposite sides of said chamber below the liquid level for providing communication with a boiler, a pipe nipple in one of said connections, a tube partly telescoped into said nipple and having its free end adjacent the opposite connection and means in said opposite connection adapted to abut and close the free end of the tube from the chamber, said tube having a hole in the side wall for providing restricted communication between the chamber and the tube thereby preventing surging from being transmitted from the boiler to the control elements within the chamber, whereby the switching apparatus is prevented from fluctuating in response to momentary surges in the boiler.

6. The apparatus of claim 5 in which the last mentioned means comprises a tube for providing communication between a gauge glass and a boiler through said telescoped tube.

7. In a boiler control switching apparatus of the type described comprising a float chamber for receiving pressure responsive and liquid level responsive switch operating elements and having coaxial opposed threaded openings in the sides below the water level, a nipple in one of said openings, a retarder tube having telescoping engagement with the nipple and having restricted openings in its side walls and a gauge glass connection screwed in the opposite threaded opening abutting said tube and closing its open end from the chamber but providing communication between a gauge glass and the tube and thereby directly with the boiler whereby the switching apparatus is shielded from momentary surges in the boiler.

8. The apparatus of claim 7 in which the floor of the float chamber is sloped to one point and has an opening at said point for providing a connection with a drain cock or water supply.

9. In a boiler control apparatus responsive to changes in water level, a float chamber having an apertured wall, a float in said chamber supported on said wall by a flexible bellows, said bellows sealing the aperture in the wall, a member pivoted on said wall, a rod secured to said float and projecting through the aperture in said wall into engagement with said member for supporting the free end of the member, and a mercury tube switch freely pivoted on said wall and lying on said member whereby a change of water level causes said float to actuate the switch through said rod and said member.

10. The combination with a float chamber having a float therein connected to an apertured side wall by a flexible bellows which seals the wall aperture, a rod rigidly connected to a wall of said float and extending through said bellows and said aperture to the outside, an annular cam adjustable axially on said rod, a switch tiltable to be moved between "on" and "off" position by said cam as said cam moves because of changes in water level within said chamber.

11. In a boiler control apparatus, a float chamber having an opening in one wall, a float in said chamber, a flexible pressure responsive member closing said opening and resiliently supporting said float, a control rod passing through said opening and connected to said float but having its free end exterior of said chamber and a switch actuating plate bent at an obtuse angle pivoted so that one portion rests upon said free end in a substantially horizontal position, and the other portion forms a cam surface in the path of axial movement of the rod, whereby the switch actuating means is operated by axial thrust of the rod.

12. In a control responsive to change in liquid level, a float chamber having an aperture in one wall, a float in said chamber, a switch operating rod rigidly connected to said float projecting through said aperture and having its free end exterior of the chamber and a stop member comprising a horizontal screw projecting from the inner wall of the chamber and having its free end in the path of movement of the float and adapted to be engaged by the float to cause the float to tilt and thereby to move the rod to operate a switch, said screw projecting through the wall of the chamber thereby providing means exterior of the chamber for adjusting the point at which the float engages said stop member.

13. In a boiler control apparatus a float and pressure chamber having an apertured side wall and adapted to be connected to a boiler, a float in said chamber, a bellows resiliently connecting the float to said side wall of the chamber and covering the wall aperture, a rod secured to the float and projecting through the aperture and switch actuating means including a plate slidably and tiltably associated with the rod and adapted to be tilted by the rod as the rod moves in response to change of pressure of water level in the chamber and thereby to actuate a switch.

14. In a boiler control apparatus, a float chamber, a compressible float in said chamber, a sleeve connected to a wall of the float and pivoted to one wall of the chamber, a rod connected to another wall of the float and passing through said sleeve and adapted to move axially in the sleeve in response to compression or expansion of the float and switch means positioned to be operated by movement of the rod.

15. The device of claim 14 in which the pivot for the sleeve is vertically adjustable.

16. The device of claim 14 in which the switch means includes a mercury tube tiltably mounted on said sleeve and means cooperating with the rod for tilting the tube in response to compression of the float.

17. In a boiler control apparatus, a float chamber having an apertured wall, a compressible float in said chamber, a tubular arm carried on a flexed pivot in said chamber and sealed at one end to said float whereby the float moves in a limited arc about said pivot in response to change in water level, the other end of said arm extending through the wall aperture, switch means positioned to be operated by said arm as it moves in response to change in water level, and means carried in the arm and connected to the float for actuating the switch in response to compression or expansion of the float.

18. In a boiler control, a chamber having openings for connection to a boiler above and below the water line whereby change in water level in the boiler is reflected in said chamber, a side wall of said chamber having an aperture therein, a substantially horizontal rod extending from inside the chamber through said aperture to the outside, a sleeve telescoped over said rod, pivoting means supporting said sleeve adjacent the aperture, means for moving said rod axially in response to change of pressure in the chamber and switch means positioned to be operated either by movement of the sleeve or movement of the rod.

19. In a boiler control apparatus, a float chamber, an elongated longitudinally compressible float in the chamber, a tube having one end sealed to one end of the float and pivotally supported to permit said end to rise and wall with the float in response to change in water level, a rod slidably supported in said tube and connected to the opposite end of the float whereby when the float is compressed the rod shifts in the tube, and switch means operatively associated with the rod and tube so as to be actuated either when the tube moves about its pivot or when the rod shifts position in the tube.

20. A liquid level and pressure responsive device comprising a float chamber, a bellows secured to a wall of said chamber, a float secured to said bellows whereby said float will move toward the wall upon increase of pressure and will tilt upon lowering of the water level, a switch operable upon tilting of the float, and a stop member secured to said wall in the path of an upper portion of said float to tilt said float upon a chosen increase of pressure.

EDWIN C. LOESSER.